United States Patent [19]

Incremona et al.

[11] 3,852,106
[45] Dec. 3, 1974

[54] POLYAMIDE-IMIDE POLYMER HAVING AN ORDERED STRUCTURE

[75] Inventors: Joseph H. Incremona, Salt Lake City, Utah; Daniel Strugar, Cherry Hill, N.J.

[73] Assignee: E. I. du Pont de Nemours and Company, Wilmington, Del.

[22] Filed: July 22, 1969

[21] Appl. No.: 843,848

Related U.S. Application Data

[63] Continuation-in-part of Ser. No. 650,195, June 30, 1967, abandoned.

[52] U.S. Cl. .............. 117/218, 117/75, 117/124 E, 117/126 GR, 117/128.4, 117/148, 117/232, 161/214, 161/230, 260/32.4, 260/32.6 N, 260/37 N, 260/47 CP, 260/65, 260/77.5 R, 260/78 TF, 260/841, 260/856, 260/857 R
[51] Int. Cl. ............................................ C08g 20/32
[58] Field of Search . 260/47 CP, 47 CB, 65, 78 TF, 260/77.5, 150; 117/72, 75, 124 E, 126 GR, 128.4, 218

[56] References Cited
UNITED STATES PATENTS

| | | | |
|---|---|---|---|
| 2,268,586 | 1/1942 | Gilman | 260/2 |
| 3,051,724 | 8/1962 | Bolton et al. | 260/325 |
| 3,274,159 | 9/1966 | Kluiber | 260/75 |
| 3,314,923 | 4/1967 | Muller et al. | 260/78 |
| 3,347,828 | 10/1967 | Stephens et al. | 260/47 |
| 3,426,098 | 2/1969 | Meyer et al. | 260/841 |
| 3,518,230 | 6/1970 | Sheffer et al. | 260/65 |

*Primary Examiner*—Lester L. Lee

[57] ABSTRACT

A film-forming polyamide-imide polymer and a process for making this polymer by reacting an anhydride of a tricarboxylic acid, a diamine, and an organic diisocyanate; the polymer having an ordered structure of recurring amide-imide-imide-amide linkages in the polymer chain and having the following recurring structural units:

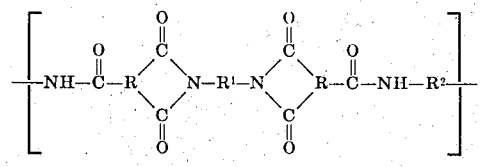

in which R is a trivalent aromatic radical, $R^1$ and $R^2$ are each divalent organic radicals having at least 2 carbon atoms.

15 Claims, No Drawings

POLYAMIDE-IMIDE POLYMER HAVING AN ORDERED STRUCTURE

CROSS REFERENCE TO RELATED APPLICATIONS

This is a continuation-in-part of our copending application Ser. No. 650,195, filed June 30, 1967, now abandoned.

BACKGROUND OF THE INVENTION

This invention relates to a polymer composition and in particular to a novel polyamide-imide polymer composition and to a novel process for making the same.

Polyimide polymers are well known for their excellent film-forming properties and high temperature resistance. For example, Edwards U.S. Pat. No. 3,179,634, issued Apr. 20, 1965, discloses polyimide polymers and processes for making the same. However, wholly polyimide polymers are quite costly to manufacture and often the very high temperature resistance of these polymers are not required for many applications, e.g., wire coating and metal coating where these products are not subjected to extremely high temperatures but are exposed to temperatures which cause rapid degradation of conventional coating compositions. For these purposes, a polyamide-imide polymer is extremely useful since it has the desired film-forming properties, temperature resistance and is an economical product.

Polyamide-imide polymers are also well known and have been made directly by reacting diamine with a tricarboxylic acid or an anhydride as disclosed in British Pat. No. 570,858, issued July 25, 1945. These polymers have also been manufactured by reacting the acid chloride of an aromatic tricarboxylic anhydride with a diamine as shown in Lavin U.S. Pat. No. 3,260,691, issued July 12, 1966. However, polymers formed according to the above processes give polymers having a random structure, i.e., the amide and imide linkages are randomly distributed along the polymer chain. Polymers such as these are very adequate for many purposes, but it would be desirable to have a polymer with an ordered structure since its physical properties are superior to the random polyamide-imide polymers.

The novel polymer of this invention has an ordered structure, i.e., the recurring units in the polymer chain have amide-imide-imide-amide ordered linkages. Moreover, the novel polymer has a higher tensile strength and a greater elongation than the random polyamide-imide polymers formed by prior art processes. Also, the novel processes of this invention is substantially free from the unwanted side chains and cross-links which often occur in the process of the aforementioned British patent.

The process of this invention is economical and gives a higher quality polymer than does the process of Lavin since chloride by-products need not be removed from the polymer as is required by Lavin.

SUMMARY OF THE INVENTION

The novel polymer of this invention is a substantially linear film-forming polyamide-imide polymer that has an ordered structure of recurring amide-imide-imide-amide linkages in the polymer chain and that has the following recurring structural units:

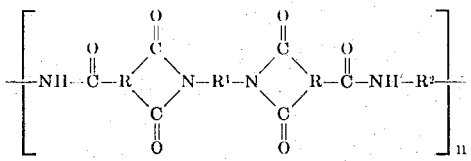

wherein R is a trivalent aromatic radical, $R^1$ and $R^2$ are each divalent organic radicals having at least 2 carbon atoms; $n$ is an integer which is sufficient to provide a film-forming polymer that has an inherent viscosity of at least 0.15 measured at 27°C. on a 0.5 percent polymer solids solution in dimethylacetamide.

Preferably, in the polymer of this invention, R is a trivalent radical from an anhydride of a tricarboxylic acid and is either

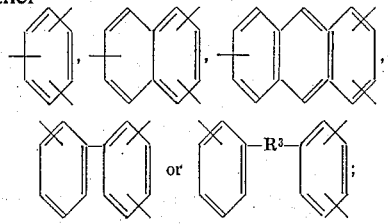

wherein $R^3$ is either an alkylene radical having 1–3 carbon atoms,

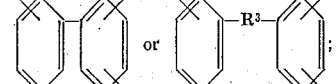

$R^1$ is either an alkylene radical having 2–12 carbon atoms,

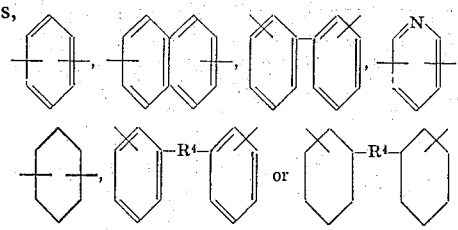

and $R^2$ is either an alkylene radical having 2–12 carbon atoms,

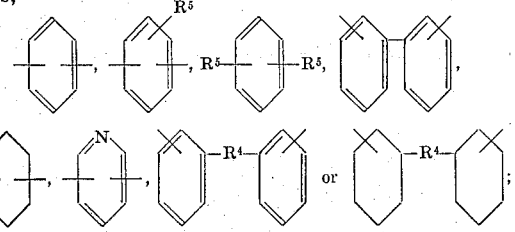

wherein $R^4$ is either an alkylene radical containing 1–4 carbon atoms,

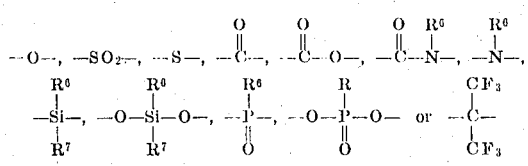

and $R^5$ is an alkyl radical of 1–3 carbon atoms and $R^6$ and $R^7$ are individually selected from the group consisting of an alkyl radical having 1–3 carbon atoms and an aryl radical.

Inherent viscosity which is directly related to molecular weight of the polymer is defined as follows:

Natural Inherent Viscosity = logarithm of the relative viscosity/C where the relative viscosity is the ratio of the solution viscosity to the solvent viscosity and C is the concentration of solvent in solution measured as grams of polymer per 100 milliliters of solution.

DESCRIPTION OF THE INVENTION

The novel process for forming the polyamide-imide of this invention comprises forming a diimide-diacid by reacting at about 125°–250°C. for about ½–3 hours an aromatic tricarboxylic anhydride with an organic diamine in a molar ratio of about 2:1. The diimide-diacid is then reacted at about 75°–210°C. for about 2–10 hours with an organic diisocyanate of the formula $R^2(NCO)_2$ in about a 1:1 molar ratio, where $R^2$ is a divalent organic radical having at least 2 carbon atoms. Preferably, a small excess of the organic diisocyanate is used to form a high quality product. Preferably, the diimide-diacid is formed by reacting at 150°–210°C. for about 1–2 hours and the polymer is formed by reacting the diimide-diacid with an organic diisocyanate at about 150°–190°C. for about 4–8 hours. The resulting polyamide-imide has an inherent viscosity of about 0.15–4 measured at 27°C. on a 0.5 percent polymer solids solution in dimethylacetamide. Preferably, the above inherent viscosity is about 0.4–2.

The aromatic tricarboxylic anhydride used in the novel process to form the polymer of this invention is of the formula

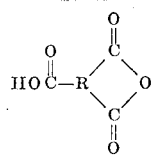

where R is a trivalent aromatic radical. The following aromatic tricarboxylic anhydrides are useful in the invention:

trimellitic anhydride,
2,3,6-naphthalene tricarboxylic anhydride,
1,5,6-naphthalene tricarboxylic anhydride, and the like;
2,6-dichloronaphthalene-4,5,7-tricarboxylic anhydride, and the like;
(carboxyphenyl)(dicarboxyphenyl anhydride)methane,
(carboxyphenyl) (dicarboxyphenyl anhydride)ethane,
(carboxyphenyl)(dicarboxyphenyl anhydride)propane,
(carboxyphenyl)(dicarboxyphenyl anhydride)ether
(carboxyphenyl)(dicarboxyphenyl anhydride)sulfide
(carboxyphenyl)(dicarboxyphenyl anhydride)sulfone
(carboxyphenyl)(dicarboxyphenyl anhydride)ketone
(carboxyphenyl)(dicarboxyphenyl anhydride) hexafluoroisopropylidene.

One preferred aromatic tricarboxylic anhydride is trimellitic anhydride since this compound is readily available and forms polymers having excellent physical properties of tensile strength and elongation and is resistant to high temperatures.

The following are examples of organic diamines that are useful in the process of this invention for forming the novel polyamide-imide polymer:
ethylene diamine,
propylene diamine,
tetramethylene diamine,
pentamethylene diamine,
hexamethylene diamine,
2-ethylhexylene diamine,
nonamethylene diamine,
decamethylene diamine,
2,11-diamino-dodecane and the like;
meta-phenylene diamine,
para-phenylene diamine,
2,2'-naphthalene diamine,
4,4'-naphthalene diamine,
2,2'-biphenylene diamine,
3,3'-biphenylene diamine,
4,4'-biphenylene diamine, and the like;
3,3'-dichloro-benzidine,
methylene dianiline-(4,4'-diaminodiphenyl methane),
ethylene dianiline-(4,4'-diaminodiphenyl ethane),
propylene dianiline-(4,4'-diaminodiphenyl propane), and the like;
oxydianiline-(4,4'-diaminodiphenylether),
ketodianiline,
4,4'-diamino-diphenyl sulfide,
3,3'-diamino-diphenyl sulfide,
4,4'-diamino-diphenyl sulfone,
3,3'-diamino-diphenyl sulfone,
bis-(para-amino-cyclohexyl)methane,
bis-(para-amino-cyclohexyl)ethane,
bis-(para-amino-cyclohexyl)propane,
bis-(para-amino-cyclohexyl)sulfide,
bis-(para-amino-cyclohdxyl)sulfone,
bis-(para-amino-cyclohexyl)ether,
bis-(para-amino-cyclohexyl)diethyl silane,
bis-(para-amino-cyclohexyl)diphenyl silane,
bis-(para-amino-cyclohexyl)ethyl phosphine oxide,
bis-(para-amino-cyclohexyl)phenyl phosphine oxide,
bis-(para-amino-cyclohexyl)N-phenyl amine,
bis-(para-amino-cyclohexyl)N-methyl amine,
hexafluoroisopropylidene-bis-(4-phenyl amine),
4,4'-diamino-diphenyl methane,
4,4'-diamino-diphenyl ethane,
4,4'-diamino-diphenyl propane,
4,4'-diamino-diphenyl butane,
2,6-diamino-pyridine,
bis-(4-amino-phenyl)diethyl silane,
bis-(4-amino-phenyl)diphenyl silane,
4,4'-dichloro-benzidine,
bis-(4-amino-phenyl)ethyl phosphine oxide,
bis-(4-amino-phenyl)phenyl phosphine oxide,
bis-(4-amino-phenyl)-N-phenylamine, bis-(4-amino-phenyl)-N-methylamine,
3,3'-dimethyl-4,4'-diamino-biphenyl,
3,3'-dimethoxy-benzidine,
2,4-bis(β-amino-t-butyl) toluene,
bis-(para-β-amino-t-butyl-phenyl)ether,
para-bis-(2-methyl-4-amino-phenyl)benzene,
para-bis-(1,1-dimethyl-5-amino-pentyl)benzene,
m-xylylene diamine,
p-xylylene diamine,
3,3'-diamino adamantane,
3,3'-diamino biadamantane,
3,3'-diaminoethyl-1,1'-biadamantane,
1,2-bis-(3-amino-propoxy)ethane,
2,2-dimethyl propylene diamine,
3-methoxy-hexamethylene diamine,
2,5-dimethylheptamethylene diamine,
5-methylnonamethylene diamine,
1,4-diamino-cyclohexane,
1,2-diamino-octadecane,
2,5-diamino-1,3,4-oxadiazole,
$H_2N(CH_2)_3O(CH_2)_2O(CH_2)_3NH_2$,
$H_2N(CH_2)_3 S (CH_2)_3NH_2$ and
$H_2N(CH_2)_3 N (CH_2)_2 NH_3$.

Preferred diamines used to form the novel polymer of this invention are methylene dianiline, oxydianiline, metaphenylene diamine and bis-(para-aminocyclohexyl)methane.

After the diimide-diacid is formed from the tricarboxylic anhydride and the diamine, the resulting product is reacted with an organic diisocyanate to form the novel polymer of this invention. The following are organic diisocyanates useful in this invention:

propylene-1,2-diisocyanate,
butylene-1,2-diisocyanate,
butylene-1,3-diisocyanate,
hexamethylene diisocyanate,
octamethylene diisocyanate,
nonamethylene diisocyanate,
decamethylene diisocyanate,
2,11-diisocyano-dodecane and the like,
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanates, such as methylpropylbenzene diisocyanate, methylethylbenzene diisocyanate, and the like;
2,2'-biphenylene diisocyanate,
3,3'-biphenylene diisocyanate,
4,4'-biphenylene diisocyanate,
3,3'-dimethyl-4,4'-biphenylene diisocyanate, and the like;
methylene-bis-(4-phenyl isocyanate),
ethylene-bis-(4-phenyl isocyanate),
isopropylidene-bis-(4-phenyl isocyanate),
butylene-bis-(4-phenylisocyanate),
hexafluoroisopropylidene-bis-(4-phenyl isocyanate), and the like;
2,2'-oxydiphenyl diisocyanate,
3,3'-oxydiphenyl diisocyanate,
4,4'-oxydiphenyl diisocyanate, and the like;
2,2'-ketodiphenyl diisocyanate,
3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like;
2,2'-sulfonediphenyl diisocyanate,
3,3'-sulfonediphenyl diisocyanate,
4,4'-sulfonediphenyl diisocyanate, and the like;
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyano-cyclohexyl)sulfide,
bis-(para-isocyano-cyclohexyl)sulfone,
bis-(para-isocyano-cyclohexyl)ether,
bis-(para-isocyano-cyclohexyl)diethyl silane,
bis-(para-isocyano-cyclohexyl)diphenyl silane,
bis-(para-isocyano-cyclohexyl)ethyl phosphine oxide,
bis-(para-isocyano-cyclohexyl)phenyl phosphine oxide,
bis-(para-isocyano-cyclohexyl)N-phenyl amine,
bis-(para-isocyano-cyclohexyl)N-methyl amine,
2,6-diisocyano-pyridine,
bis-(4-isocyano-phenyl)diethyl silane,
bis-(4-isocyano-phenyl)diphenyl silane,
dichloro-biphenylene diisocyanate,
bis-(4-isocyano-phenyl)ethyl phosphine oxide,
bis-(4-isocyano-phenyl)phenyl phosphine oxide
bis-(4-isocyano-phenyl)-N-phenyl amine,
bis-(4-isocyano-phenyl)-N-methyl amine,
3,3'-dimethyl-4,4'-diisocyano biphenyl,
3,3'-dimethoxy-biphenylene diisocyanate,
2,4-bis-(β-isocyano-t-butyl)toluene,
bis-(para-β-isocyano-t-butyl-phenyl)ether,
para-bis-(2-methyl-4-isocyano-phenyl)benzene,
para-bis-(1,1-dimethyl-5-amino-pentyl)benzene,
3,3'-diisocyano adamantane,
3,3'-diisocyano biadamantane,
3,3'-diisocyanoethyl-1,1'-biadamantane,
1,2-bis-(3-isocyano-propoxy)ethane,
2,2-dimethyl propylene diisocyanate,
3-methoxy-hexamethylene diisocyanate,
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxadiazole,
$OCN(CH_2)_3 O(CH_2)_2 O(CH_2)_3 NCO$,
$OCN(CH_2)_3 S(CH_2)_3 NCO$ and
$OCN(CH_2)_3 N(CH_2)_3 NCO$.

Preferred organic diisocyanates are toluene-2,4-diisocyanate, toluene-2,6-diisocyanate or a mixture thereof, xylene diisocyanate, m-phenylene diisocyanate, 4,4'-methylene-bis-(4-phenyl isocyanate), and 4,4'-methylene-bis-(cyclohexyl isocyanate).

After the novel polyamide-imide is formed by the process of this invention, it may be stored for later use or it may be used immediately to form shaped articles or as a coating composition. After the novel polyamide-imide is formed into a shaped article, e.g., a film, filament tube rod and the like, or applied as a coating or as an adhesive, it preferably is heated to drive off residual solvents.

Cross-linking resins can be added to the polymer to form a thermosetting coating composition such as condensates of formaldehyde with phenol, melamine, urea or benzoguamine; melamine/toluene sulfonamide; a polyglycol such as trishydroxyethyl isocyanurate and the like. The addition of the cross-linking agent imparts hardness and resistance to solvent alkali and heat to a coating formed from the composition.

Inert materials may be added to the novel polyamideimide of this invention, for example, pigments such as titanium dioxide, carbon black; metal particles, abrasives, and lubricating polymers. These materials are blended by using such customary procedures as sand-grinding or ball milling the ingredients. When used as a coating composition, the polyamideimide can be applied by the usual techniques e.g., doctoring, rolling, dipping, flowcoating, brushing, spraying, and the like, to a great variety of substrates, such as copper, brass, aluminum, steel and other metals in the form of sheets, wires or screens. The novel polyamide-imide as a coating can also be applied to mineral structures, such as asbestos; to glass in the form of sheets, fibers or fabrics. The novel polyamideimide of this invention can be used as a coating on high temperature polymeric materials such as high temperature polyamides, polyimides, polyamide-imides and the like in the form of fibers, sheets and fabrics. Also, the novel polymer of this invention can be used as an adhesive composition and forms excellent adhesive bonds between such materials as metals, wood, polymeric materials and the like. The novel polyamide-imide is particularly useful as a high quality wire enamel for wires of copper, steel, aluminum and the like. The novel polymer can be applied by conventional wire coating techniques and equipment and gives a coating of excellent flexibility, good abrasion resistance, and high dielectric strength.

The novel polyamide-imide of this invention is particularly useful as a wire overcoating, i.e., as a coating which is applied over an insulating polymeric material on a wire. Typical wire insulating materials over which the novel polymer of this invention is applied as an overcoat are, for example, polyesters, such as ethyleneglycol terephthalate/tris-2-hydroxyethyl isocyanurate; polyester-imides, such as the polyester-imides of trimellitic anhydride and methylene dianiline; aromatic polyamides; aromatic polyimides and the like. Wires over-coated with the novel polymer of this invention have particularly good abrasion and flex resistance and a high dielectric strength.

The following examples illustrate the invention.

EXAMPLE 1

The following ingredients are charged into a reaction vessel:

| | Parts By Weight |
|---|---|
| Portion 1 | |
| Trimellitic anhydride | 192 |
| Methylene dianiline | 99 |
| N-methyl pyrrolidone | 890 |
| Portion 2 | |
| Methylene-bis-(4-phenyl isocyanate) | 138 |
| N-methyl pyrrolidone | 125 |
| Total | 1444 |

Portion 1, trimellitic anhydride, methylene dianiline and N-methyl pyrrolidone, is charged into a reaction vessel equipped with a stirrer, thermometer, a nitrogen inlet, and a distillation column packed with stainless steel saddles and insulated with a glass wool cover. The reactants are blanketed with an atmosphere of nitrogen and rapidly heated to about 207°C. to dissolve the reactants. The reaction mixture is held at the reflux temperature for about 1 hour and water is removed to form the diimide-diacid. The reaction mixture is then cooled to 180°C. Methylene bis-(4-phenyl isocyanate) is then dissolved in N-methyl pyrrolidone and then Portion 2 is slowly added to the reaction mixture over about a 20 minute period. The reaction mixture is reheated to about 180°C. and held at this temperature for about 3 hours. About 362 parts by N-methyl pyrrolidone are added to the reaction mixture to give a 22 percent solids solution having a viscosity of about 100 poises. The viscosity is measured at 25°C, with a Brookfield LVT viscometer at 12 RPM with a No. 3 spindle.

A sample of the solution is precipitated into acetone, filtered and dried under a vacuum at about 100°C. The inherent viscosity of the polymer is measured at 27°C. using a 0.5 percent solids solution in dimethylacetamide and is about 0.59.

A film is prepared from the polymer solution by casting a 5 mil thick wet film on a glass substrate and by drying this film at about 150°–250°C. The resulting film is durable and flexible. A metal substrate is similarly coated with the polymer solution. The resulting coating is scratch resistant, flexible and has good adhesion to the metal substrate. A copper wire is coated with the polymer solution using a standard wire coating technique. The coating on the wire has excellent flexibility, good abrasion resistance and has a high dielectric strength.

EXAMPLE 2

The following ingredients are charged into a reaction vessel equipped as in Example 1:

| | Parts By Weight |
|---|---|
| Portion 1 | |
| Trimellitic anhydride | 192 |
| Methylene dianiline | 99 |
| N-methyl pyrrolidone | 890 |
| Portion 2 | |
| Toluene-2,4-diisocyanate | 96 |
| N-methyl pyrrolidone | 87 |
| Total | 1364 |

Portion 1 is charged into a reaction vessel and the reactants are blanketed with an atmosphere of nitrogen and heated to about 200°C. to dissolve the reactants. The reaction mixture is held at the reflux temperature for about 1 hour and water is removed during this time to form the diimide-diacid. The reaction mixture is then cooled to about 180°C. The toluene diisocyanate is dissolved in N-methyl pyrrolidone and then Portion 2 is slowly added to the reaction mixture over about a 20 minute period. The reaction mixture is reheated to about 180°C. and held at this temperature for about 3 hours. About 362 parts of N-methyl pyrrolidone are added to the reaction mixture to give a 20 percent solids solution having a viscosity of 20 poises at 25°C. measured as in Example 1.

A sample of the solution is precipitated into acetone, filtered and dried under a vacuum at about 100°C. The inherent viscosity of the polymer is measured at 27°C. using a 0.5 percent solids solution in dimethylacetamide and is about 0.45.

A film is prepared from the polymer solution by casting a 5 mil thick wet film on a glass substrate and by drying this film at about 150°–250°C. The resulting film is durable and flexible. A metal substrate is similarly coated with the polymer solution. The resulting coating is scratch resistant, flexible and has good adhesion to the metal substrate. A copper wire is coated with the polymer solution using a standard wire coating technique. The coating on the wire has excellent flexibility, good abrasion resistance and has a high dielectric strength.

EXAMPLE 3

The following ingredients are charged into a reaction vessel equipped as in Example 1:

| | Parts By Weight |
|---|---|
| Portion 1 | |
| Trimellitic anhydride | 192 |
| Oxydianiline | 100 |
| N-methyl pyrrolidone | 890 |
| Portion 2 | |
| Methylene bis-(4-phenyl isocyanate) | 138 |
| N-methyl pyrrolidone | 125 |
| Total | 1445 |

Portion 1 is charged into a reaction vessel equipped as in Example 1 and the reactants are blanketed with an atmosphere of nitrogen and heated to about 200°C. to dissolve the reactants. The reaction mixture is held at the reflux temperature for about 1 hour and water is removed during this time to form the diimide-diacid. The reaction mixture is then cooled to about 190°C. The methylene bis-(4-phenyl isocyanate) is dissolved in N-methyl pyrrolidone and then Portion 2 is slowly added to the reaction mixture over about a 20 minute period. The reaction mixture is reheated to about 190°C. and held at this temperature for about 5 hours. About 362 parts of N-methyl pyrrolidone are added to the reaction mixture to give a 22 percent solids solution having a viscosity of about 60 poises at 25°C. measured as in Example 1.

A sample of the solution is precipitated into acetone, filtered and dried under a vacuum at about 100°C. The inherent viscosity of the polymer is measured at 27°C. using a 0.5 percent solids solution in dimethylacetamide and is about 0.63.

A film is prepared from the polymer solution by casting a 5 mil thick wet film on a glass substrate and by drying this film at about 150°–250°C. The resulting film is durable and flexible. A metal substrate is similarly coated with the polymer solution. The resulting coating is scratch resistant, flexible and has good adhesion to the metal substrate. A copper wire is coated with the polymer solution using a standard wire coating technique. The coating on the wire has excellent flexibility, good abrasion resistance and has a high dielectric strength.

EXAMPLE 4

The following ingredients are charged into a reaction vessel equipped as in Example 1:

| | Parts By Weight |
|---|---|
| Portion 1 | |
| Trimellitic anhydride | 384 |
| M-phenylene diamine | 108 |
| N-methyl pyrrolidone | 1235 |
| Portion 2 | |
| Toluene-2,4-diisocyanate | 192 |
| N-methyl pyrrolidone | 174 |
| Total | 2093 |

Portion 1 is charged into a reaction vessel equipped as in Example 1 and the reactants are blanketed with an atmosphere of nitrogen and heated to about 200°C. to dissolve the reactants. The reaction mixture is held at the reflux temperature for about 1 hour and water is removed during this time to form the diimide-diacid. The reaction mixture is then cooled to about 180°C. The toluene diisocyanate is dissolved in N-methyl pyrrolidone and is slowly added to the reaction mixture over about a 20 minute period. The reaction mixture is reheated to about 180°C. and held at this temperature for about 3 hours. The resulting polymer solution has a 29 percent solids content and a viscosity of 184 poises at 25°C. measured as in Example 1.

A sample of the solution is precipitated into acetone, filtered and dried under a vacuum at about 100°C. The inherent viscosity of the polymer is measured at 27°C. using a 0.5 percent solids solution in dimethylacetamide and is about 0.38.

A film is prepared from the polymer solution by casting a 5 mil thick wet film on a glass substrate and by drying this film at about 125°–250°C. The resulting film is durable and flexible. A metal substrate is similarly coated with the polymer solution. The resulting coating is scratch resistant, flexible and has good adhesion to the metal substrate. A copper wire is coated with the polymer solution using a standard wire coating technique. The coating on the wire has excellent flexibility, good abrasion resistance and has a high dielectric strength.

EXAMPLE 5

The following ingredients are charged into a reaction vessel equipped as in Example 1:

| | Parts By Weight |
|---|---|
| Portion 1 | |
| Trimellitic anhydride | 192 |
| Bis-(para-aminocyclohexyl)methane | 103 |
| N-methyl pyrrolidone | 890 |
| Portion 2 | |
| Toluene-2,4-diisocyanate | 87 |
| Portion 3 | |
| Toluene-2,4-diisocyanate | 9 |
| Total | 1281 |

Portion 1 is charged into a reaction vessel and the reactants are blanketed with an atmosphere of nitrogen and heated to about 200°C. to dissolve the reactants. The reaction mixture is held at the reflux temperature for about 1 hour and water is removed during this time to form the diimide-diacid. The reaction mixture is then cooled to about 190°C. Portion 2, the toluene diisocyanate, is slowly added to the reaction mixture over about a 20 minute period. The reaction mixture is reheated to about 190°C. and held at this temperature for about 1.5 hours, then Portion 3 is slowly added. The mixture is heated at 190°C. for about 3 hours. About 323 parts of N-methyl pyrrolidone are added to the reaction mixture to give a 22 percent solids solution having a viscosity of 75 poises at 25°C. measured as in Example 1.

A sample of the solution is precipitated into acetone, filtered and dried under a vacuum at about 100°C. The inherent viscosity of the polymer is measured at 27°C. using a 0.5 percent solids solution in dimethylacetamide and is about 0.38.

A film is prepared from the polymer solution by casting a 5 mil thick wet film on a glass substrate and by drying this film at about 125°–150°C. The resulting film is durable and flexible. A metal substrate is similarly coated with the polymer solution. The resulting coating is scratch resistant, flexible and has good adhesion to the metal substrate. A copper wire is coated with the polymer solution using a standard wire coating technique. The coating on the wire has excellent flexibility, good abrasion resistance and has a high dielectric strength.

We claim:

1. A film-forming polyamide-imide polymer having an ordered structure of recurring amide-imide-imide-amide linkages in the polymer chain consisting essentially of the following recurring structural units:

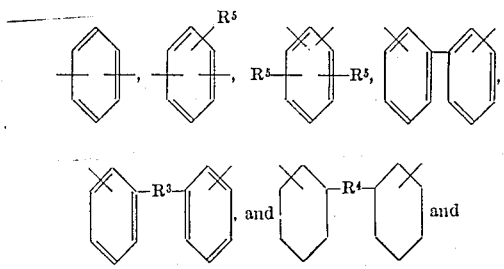

where R is a trivalent aromatic radical selected from the group consisting of

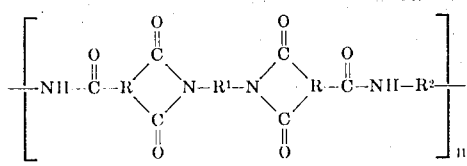

wherein $R^3$ is selected from the group consisting of an alkylene radical having 1-3 carbon atoms, $$-O-, -SO_2-, -S-, \text{ and } -\overset{O}{\underset{\|}{C}}-$$

wherein $R^1$ is a divalent organic radical selected from the group consisting of an alkylene radical having 2-8 carbon atoms,

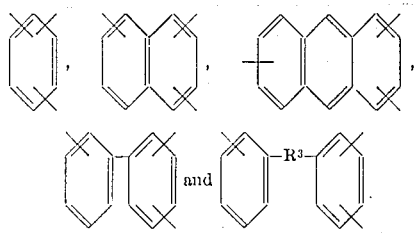

and $R^2$ is a divalent organic radical selected from the group consisting of an alkylene radical having 2-6 carbon atoms,

wherein $R^4$ is selected from the group consisting of an alkylene radical containing 1-3 carbon atoms;

$R^5$ is an alkyl radical of 1-3 carbon atoms, and $n$ is an integer sufficient to provide a polymer having an inherent viscosity of at least 0.15 and up to 4.0 measured at 27°C. on a 0.5 percent polymer solids solution in dimethylacetamide.

2. The polyamide-imide polymer of claim 1 in which R is

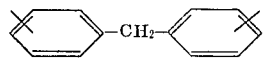

3. The polyamide-imide polymer of claim 2 in which $R^1$ and $R^2$ are

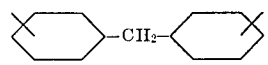

4. The polyamide-imide polymer of claim 2 in which $R^1$ is

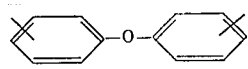

and
$R^2$ is toluylene.

5. The polyamide-imide polymer of claim 2 in which $R^1$ is

and
$R^2$ is

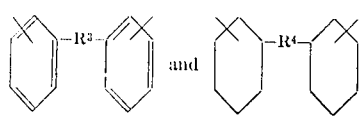

6. The polyamide-imide polymer of claim 2 in which

R¹ is

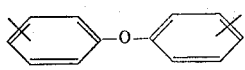

and
R² is toluylene.

7. The polyamide-imide polymer of claim 2 in which R¹ is phenylene and R² is toluylene.

8. The polyamide-imide of claim 2 in which R¹ is

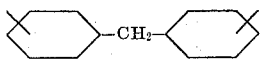

and R² is toluylene.

9. The polyamide-imide polymer of claim 2 in which

R¹ is

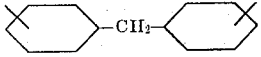

and
R² is

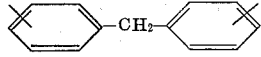

10. A coating composition comprising the polymer of claim 1 and a solvent for the polymer.

11. A coated sheet material comprising a coalesced layer of the polymer of claim 1 in firm adherence to a flexible substrate.

12. A coated wire comprising a coalesced layer of the polymer of claim 1 in firm adherence to the wire.

13. A coated wire comprising a high temperature resistant polymeric layer in firm adherence to the wire and having an overcoat of a coalesced layer of the polymer of claim 1 in firm adherence to said high temperature resistant polymeric layer.

14. A film-forming polyamide-imide polymer consisting essentially of the repeating unit:

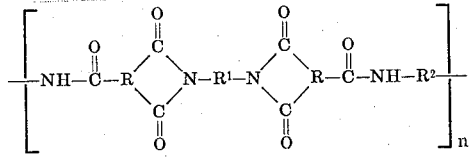

where R is selected from the group consisting of

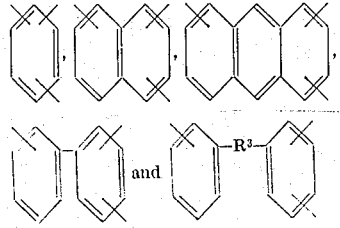

wherein R³ is selected from the group consisting of an alkylene radical having 1–3 carbon atoms, —O—, —S—, —SO₂—, and

wherein R¹ is selected from the group consisting of an alkylene radical having 2–8 carbon atoms,

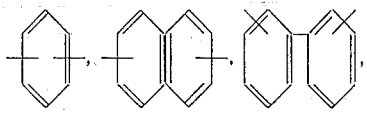

wherein R² is selected from the group consisting of an alkylene radical having 2–6 carbon atoms,

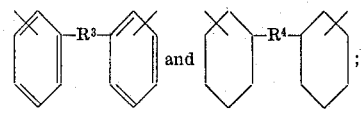

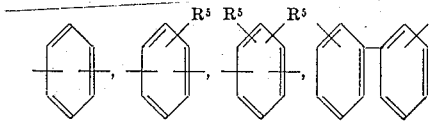

wherein R⁴ is an alkylene group having 1–3 carbon atoms; R⁵ is an alkyl group having 1–3 carbon atoms; and n is an integer sufficient to provide a polymer having an inherent viscosity of at least 0.15 measured at 27°C. on a 0.5 polymer solids solution in dimethylacetamide.

15. A method of preparing polyamide-imides of claim 1 consisting essentially of reacting a diimide di-acid having the formula

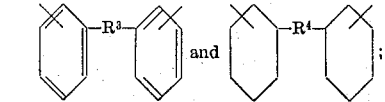

where R is selected from the group consisting of

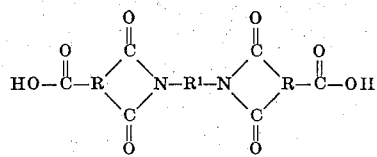

wherein R³ is selected from the group consisting of an alkylene radical having 1–3 carbon atoms, —O—, —S—, —SO₂—, and

and wherein R¹ is selected from the group consisting of an alkylene radical having 2–8 carbon atoms,

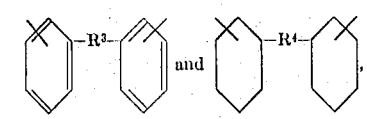

with an organic diisocyanate of the formula $R^2(NCO)_2$ wherein $R^2$ is selected from the group consisting of an alkylene radical having 2–6 carbon atoms
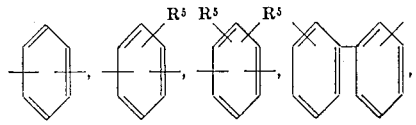
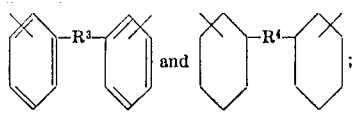
wherein $R^4$ is an alkylene group having 1–3 carbon atoms; $R^5$ is an alkyl group having 1–3 carbon atoms, in a solvent of N-methyl pyrrolidone.
* * * * *